United States Patent [19]

Richards et al.

[11] Patent Number: 4,973,083
[45] Date of Patent: Nov. 27, 1990

[54] SEATBELTS HAVING IMMOVABLE ANCHOR STRAPS

[76] Inventors: Lawrence O. Richards; Sue Richards, both of 13209 Sumpter Cir., Hudson, Fla. 34667

[21] Appl. No.: 448,852

[22] Filed: Dec. 12, 1989

[51] Int. Cl.5 .............................................. B60R 22/00
[52] U.S. Cl. .................................... 280/801; 280/808; 297/484
[58] Field of Search ............... 280/801, 808; 297/484, 297/483

[56] References Cited

U.S. PATENT DOCUMENTS

| | | | |
|---|---|---|---|
| 3,321,247 | 5/1967 | Dillender | 297/484 |
| 3,380,776 | 4/1968 | Dillender | 297/484 |
| 3,385,633 | 5/1968 | Aizley | 297/484 |
| 3,463,545 | 8/1969 | Curran | 297/484 |
| 3,633,965 | 1/1972 | Norman et al. | 297/484 |
| 3,834,758 | 9/1974 | Soule | 297/484 |
| 4,324,204 | 4/1982 | Friedman | 280/801 |
| 4,341,422 | 7/1982 | Cunningham | 297/488 |
| 4,632,425 | 12/1986 | Barratt | 280/801 |
| 4,709,966 | 12/1987 | Parkinson et al. | 297/484 |

*Primary Examiner*—Kenneth R. Rice
*Attorney, Agent, or Firm*—Stanley M. Miller

[57] ABSTRACT

A seatbelt construction that includes parallel, vertically aligned strap members that tightly overlie the back part of a seat. The vertical strap members are spaced about shoulder width apart and are interconnected by a third strap member. In a first embodiment, the third strap is horizontally disposed at any preselected height along the extent of the parallel strap members. In a second embodiment, the opposite ends of the third strap are pivotally connected to the parallel straps so that the third strap can be angled from the horizontal when interconnecting the parallel straps. Both embodiments safely secure the passenger without relying on lap belts.

10 Claims, 3 Drawing Sheets

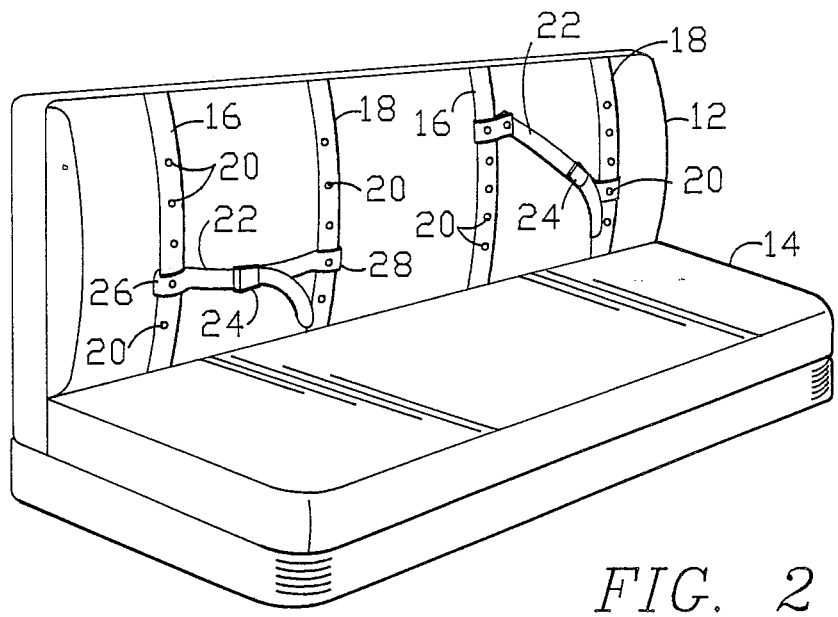
FIG. 2
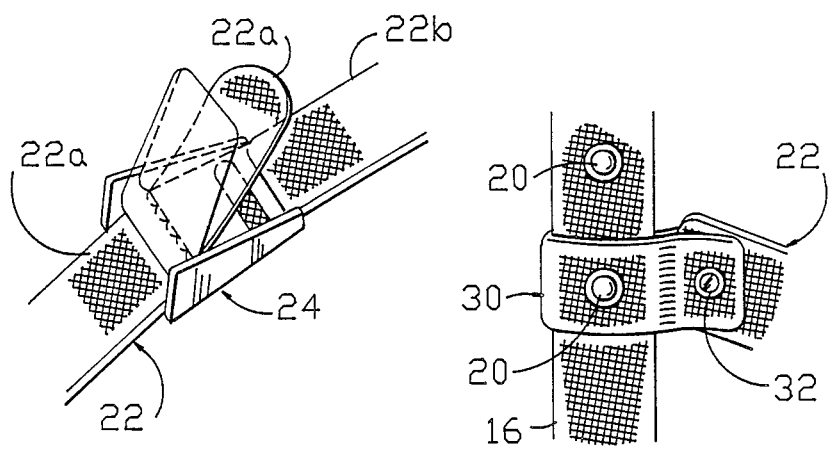
FIG. 7
FIG. 4

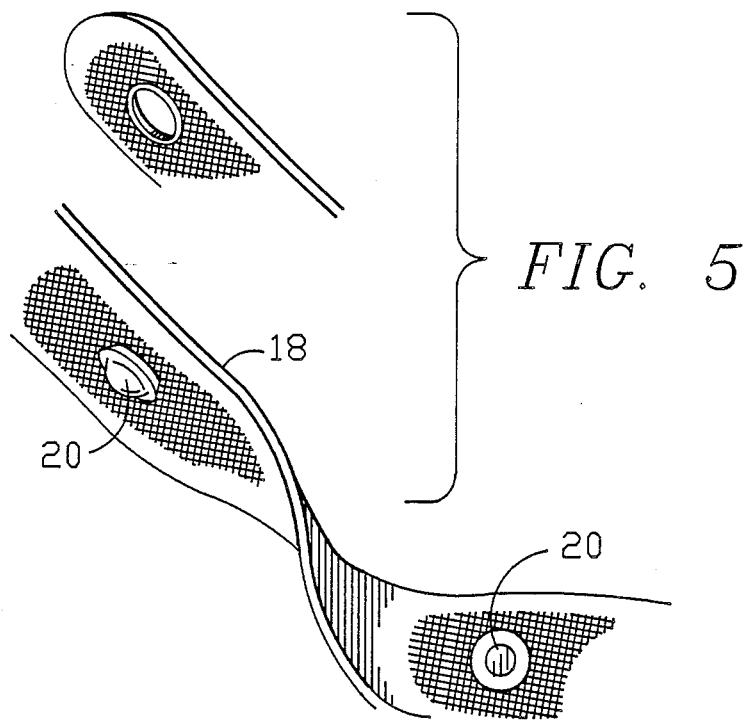
FIG. 5
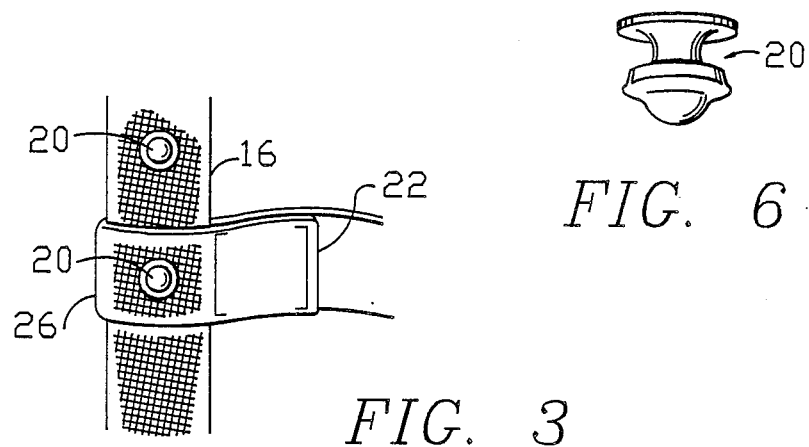
FIG. 6
FIG. 3

SEATBELTS HAVING IMMOVABLE ANCHOR STRAPS

BACKGROUND OF THE INVENTION

1. Field of the Invention

This invention relates, generally, to seatbelts. More particularly, it relates to a seatbelt construction where a belt that extends across the body of the strapped individual has opposite ends securely anchored to anchor strap members that are fixedly secured to the back of the seat upon which the strapped individual is seated.

2. Description of the prior art

The benefits of seatbelts are so well known that many states have now passed laws requiring their use. Many inventors have developed improvements to seatbelts over the years, but the art has heretofore failed to provide seatbelts of high versatility.

U.S. Pat. No. 3,380,776 to Dillender (1968) shows a seatbelt construction that adds a child harness to the basic seatbelt construction. The device has utility, but has only one operable configuration.

Another 1968 U.S. Pat. No. 3,385,633 to Aizley, shows a seatbelt construction that includes a harness and which is laterally positionable along a laterally extending seat, but other than its lateral adjustability, the apparatus is not otherwise versatile.

A seatbelt specifically designed to retain a child's seat is shown in U.S. Pat. No. 3,633,965 to Norman (1972).

A safety restraint for animals riding in vehicles is shown in U.S. Pat. No. 4,324,204 to Friedman (1982). That restraint includes a pair of parallel strap members securely anchored to the back of a seat and a harness for an animal having straps that are independently attachable to the parallel strap members.

Other patents of interest include U.S. Pat. Nos. 3,321,247 to Dillender (1967), 3,463,545 to Curran (1969), 4,341,422 to Cunningham (1982) and 4,632,425 to Barratt (1986).

Most seatbelt configurations rely heavily on lap belts that have been known to cause rather than prevent injury. Moreover, many vehicles, such as school buses, have bench-type seats that are not equipped with seatbelts of any kind. Thus, there is a need for a seatbelt construction that protects passengers without injuring them, and there is a need for a construction that would be suitable for use on school buses and similar vehicles.

SUMMARY OF INVENTION

The present invention fulfills a longstanding need and has three primary parts: a first, a second and a third strap member. The first and second strap members are disposed in laterally spaced apart, parallel relation to one another and are fixedly and tightly secured to the back of a seat. Importantly, the opposite ends of the first and second strap members are fixedly secured to the back of the seat so that the straps are not removable by the passenger.

A plurality of equidistantly and vertically spaced apart protuberances, of rivet-like construction, are mounted on each of the first and second strap members along the respective extents thereof.

The third strap member is disposed in interconnecting relation between the first and second strap members; in a first embodiment, its opposite ends are looped and said loops are apertured to releasably but securely engage the protuberances formed on the parallel strap members. In a second embodiment, apertured loop members are provided for engaging the protuberances, but the opposite ends of the third strap are pivotally engaged to the loop members to increase the versatility of the invention.

In either embodiment, the third strap is positionable in a plurality of positions of functional adjustment relative to the first and second strap members. In a first configuration, the third strap is positioned in interconnecting relation to directly opposite, transversely spaced apart protuberances carried by the first and second strap members; in other configurations, the third strap is diagonally disposed relative to the first and second straps.

It should therefore be understood that a primary object of the present invention is to provide a seatbelt construction that protects passengers and minimizes the chance that the belt itself could cause injury.

Another object of the invention is to provide a highly versatile seatbelt construction that can take a number of different yet effective configurations.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 2 is a perspective view of a school bus seat showing two preferred configurations of the present invention;

FIG. 3 is a detailed perspective view showing the looped connection between straps employed in the first embodiment of the invention;

FIG. 4 is a detailed perspective view showing the pivotal connection between straps employed in the second embodiment of this invention;

FIG. 5 is a detailed perspective view showing both sides of either a first or second strap;

FIG. 6 is a perspective view of a protuberance of rivet-like construction; and

FIG. 7 is a detailed perspective view showing how the separate parts of the third strap are releasably coupled together.

Similar reference numerals refer to similar parts throughout the several views of the drawings.

DETAILED DESCRIPTION OF THE PREFERRED EMBODIMENT

Figure 1:
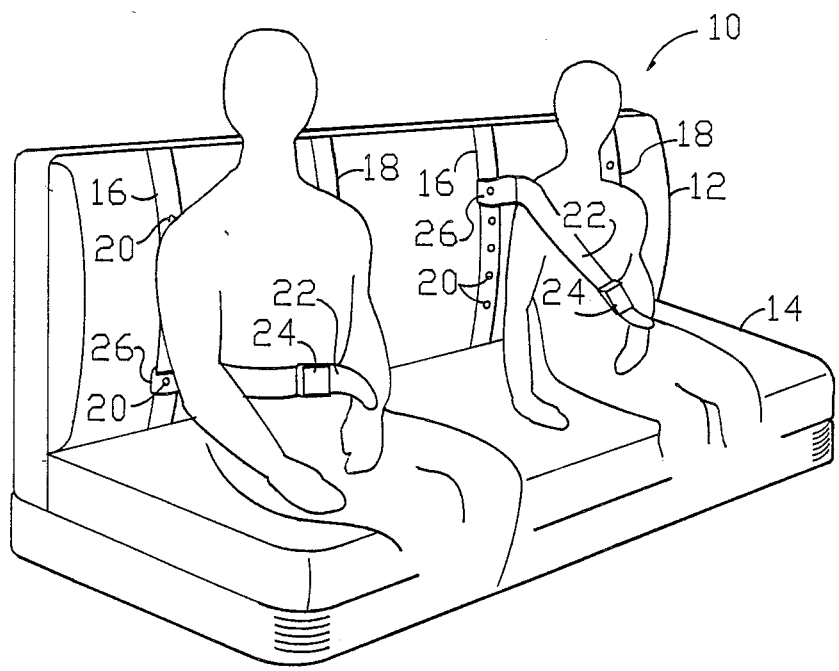
FIG. 1 is a perspective view of a school bus seat where two passengers are protected by two different configurations of the seatbelt of the present invention.

Referring now to FIG. 1, it will there be seen that a school bus seat and individuals seated thereon are denoted as a whole by the reference numeral 10. The seat may be a bus seat or other type of seat; it has a back part 12 and a bottom part 14. Importantly, no seatbelts are secured to the bottom part 14 of the seat and the problems associated with lap belts are thereby avoided.

The individual on the left of FIG. 1 is shown protected by a belt of the first embodiment of this invention and the individual on the right is shown protected by a belt of the second embodiment hereof.

The first and second embodiments are perhaps more clearly shown in FIG. 2 which shows the belts when not in use.

Both the first and second embodiments includes transversely spaced apart, vertically aligned first and second strap members 16, 18 that are very tightly secured to back part 12 of the seat by any number of suitable means so that they are not removable by a passenger.

Preferably, straps 16, 18 are spaced about shoulder-width apart from one another and are substantially parallel to one another.

Straps 16, 18 of both embodiments also include a plurality of protuberances, collectively denoted 20, disposed in equidistantly and vertically spaced relation to one another along the respective extents of said straps as shown. The protuberances 20 may have a rivet-like construction as shown in FIGS. 5 and 6.

Both embodiments also include a third strap 22 disposed in interconnecting relation therebetween.

Each strap 22 has two separate parts, 22a and 22b, as perhaps best shown in FIG. 7, that confront one another and that are releasably coupled together by a buckle member 24 of conventional and well-known construction.

The opposite ends of the third strap are configured differently for the first and second embodiments.

As best shown in FIG. 2, the opposite ends of strap 22 are denoted 26, 28; as best depicted in FIG. 3, end 26 is of looped construction and has an aperture formed centrally thereof to receive a preselected protuberance 20. Opposite end 28 thereof is of the same construction. When a preselected protuberance 20 of each vertical strap 16, 18 is tightly snap fittingly engaged in an aperture formed in a looped end of the third strap 22 as depicted, the individual is safely restrained because a forward pressure along the extent of the third strap will not release the snap fitted engagement between said protuberance 20 and its associated aperture.

It should be clear that the third strap 22 of this first embodiment may be placed in a low configuration as depicted in the left side of FIG. 1 where the two lowermost opposing protuberances are interconnected by strap 22, or it may be placed higher as depicted in FIG. 2 or even higher, not shown. In all such configurations, strap 22 will always interconnect directly opposed protuberances 20 because the looped ends of strap 22 are not pivotal, i.e., strap 22 will always be disposed in a substantially horizontal disposition.

However, a pivotal interconnection between the opposite ends of the third strap 22 and the vertical straps is provided in the second embodiment so that third strap member 22 may assume dispositions that are angled with respect to the horizontal.

As shown in FIG. 4, a loop member 30 having a central aperture for selective releasable engagement with any protuberance 20 is pivotally interconnected to strap 22 at a pivot point 32 which is provided by a rivet or other suitable means. This enables strap 22 to pivot in a vertical plane with respect to loop 30. As best understood in connection with FIGS. 1 and 2, such pivotal interconnection enables strap 22 to assume many different configurations, i.e., a left end thereof may be mounted high and the right end thereof may be mounted low, or vice versa, or the left and right ends could be mounted to straps 16, 18, respectively, at the same elevation. When mounted at the same elevation, strap 22 of the second embodiment would then be configured in the same configuration as in the first, non-inclined embodiment.

Thus, the pivotal interconnection between vertical straps 16, 18 and third strap 22 increases the versatility of the structure while still enabling the horizontal configuration on the left side of FIGS. 1 and 2 to be arranged if desired.

Buckle 24 may be of many different types, not just of the particular type shown. It may have Velcro (TM) fastening means, for example. Moreover, many different means can be employed for effecting the releasable attachment of the opposite ends of the third strap to the vertical straps at any preselected position along the respective extents of said vertical straps. Additionally, the protuberances can be replaced with numerous other fastening means. Thus, the first and second straps could be notched along their extents as well and mating notches could be provided on the third strap to achieve the needed releasable attachments. Plastic fittings and countless other fastening means could be employed to interconnect the straps. It should therefore be clear that this invention relates to the disclosure of the transversely spaced apart vertical straps that are tightly secured to the back of a seat and the third strap that is disposed in interconnecting relation therebetween in differing configurations, and not to any specific buckle means or attachment means.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A seatbelt construction, comprising:
   a first, vertically aligned strap member disposed in tight fitting, overlying relation to the back part of a seat;
   a second, vertically aligned strap member disposed in tight fitting, overlying relation to the back part of a seat;
   said first and second strap members being disposed in transversealy spaced apart relation to one another by a predetermined distance and being disposed in substantial parallelism to one another;
   a third strap member;
   said third strap member having first and second parts disposed in confronting relation to one another;
   a buckle member carried at an end of said first part for releasably coupling together said first and second parts;
   said third strap member having opposite ends adapted to releasably engage said first and second strap members so that said third strap member interconnects said first and second strap members when said first and second confronting parts of said third strap member are coupled together by said buckle member;

a plurality of vertically spaced fastening members being fixedly secured to said first and second strap members along their respective vertical extents;

a first loop member being disposed in surrounding relation to said first strap member;

a second loop member being disposed in surrounding relation to said second strap member;

each of said first and second loop members having an aperture formed therein of sufficient diameter to receive a preselected fastening member to thereby releasably secure said first and second loop members to said first and second strap members, respectively; and said third strap member opposite ends being formed integrally with said loop members so that said third strap member extends in a substantially horizontal plane between said first and second strap members at any preselected height along the respective extents thereof.

2. The seatbelt of claim 1, wherein said fastening members are equidistantly spaced along the respective vertical extents of said first and second strap members.

3. The seatbelt of claim 2, wherein said fastening members are protuberances of rivet-like construction.

4. The seatbelt of claim 3, wherein said predetermined distance is substantially equal to the width of the shoulders of an individual of average size.

5. The seatbelt of claim 4, wherein each of said apertures is formed substantially centrally of its associated loop member.

6. A seatbelt construction, comprising:

a first, vertically aligned strap member disposed in tight fitting, overlying relation to the back part of a seat;

a second, vertically aligned strap member disposed in tight fitting, overlying relation to the back part of a seat;

said first and second strap members being disposed in transversely spaced apart relation to one another by a predetermined distance and being disposed in substantial parallelism to one another;

a third strap member;

said third strap member having first and second parts disposed in confronting relation to one another;

a buckle member carried at an end of said first part for releasably coupling together said first and second parts;

said third strap member having opposite ends adapted to releasably engage said first and second strap members so that said third strap member interconnects said first and second strap members when said first and second confronting parts of said third strap member are coupled together by said buckle member;

a plurality of vertically spaced fastening members being fixedly secured to said first and second strap members along their respective vertical extents;

a first loop member being disposed in surrounding relation to said first strap member;

a second loop member being disposed in surrounding relation to said second strap member;

each of said first and second loop members having an aperture formed therein of sufficient diameter to receive a preselected fastening member to thereby releasably secure said first and second loop members to said first and second strap members, respectively; and said third strap member opposite ends being pivotally connected to different loop members of said first and second loop members.

7. The seatbelt of claim 6, wherein said fastening members are equidistantly spaced along the respective vertical extents of said first and second strap members.

8. The seatbelt of claim 7, wherein said fastening members are protuberances of rivet-like construction.

9. The seatbelt of claim 8, wherein said predetermined distance is substantially equal to the width of the shoulders of an individual of average size.

10. The seatbelt of claim 9, wherein each of said apertures is formed substantially centrally of its associated loop member.

* * * * *